United States Patent [19]

Kudo et al.

[11] Patent Number: 5,014,078

[45] Date of Patent: May 7, 1991

[54] PSEUDO FOCAL LENGTH CAMERA

[75] Inventors: Yoshinobu Kudo; Masataka Hamada; Yoshiaki Hata; Hiroshi Ootsuka; Manabu Inoue; Shigeru Wada; Yoshihiro Tanaka, all of Osaka, Japan

[73] Assignee: Minolta Camera Kabushiki Kaisha, Osaka, Japan

[21] Appl. No.: 530,119

[22] Filed: May 29, 1990

[30] Foreign Application Priority Data

May 30, 1989 [JP] Japan .................................. 1-136552

[51] Int. Cl.$^5$ ............................................. G03B 13/12
[52] U.S. Cl. .................................... 354/195.1; 354/222
[58] Field of Search .............................. 354/195.1, 222

[56] References Cited

FOREIGN PATENT DOCUMENTS 63-220118  9/1988  Japan .
64-39172   2/1989  Japan .
1-107240   4/1989  Japan .

OTHER PUBLICATIONS

Carl Shipman, "How to Select & Use Minolta MAXXUM SLR Cameras," pp. 5 and 6, HPBooks, Inc., Tucson, Arizona, 1986.

Primary Examiner—Michael L. Gellner
Attorney, Agent, or Firm—Burns, Doane, Swecker & Mathis

[57] ABSTRACT

A pseudo focal length camera which takes a photograph using an optical system of a single focal length. A printed photograph has a feature similar to that obtained by taking a photograph using an optical system comprising a plurality of photographing lenses each having a different focal length. Information indicating an image forming area corresponding to a designated pseudo focal length is recorded on a film when a photograph is taken and a printing is carried out based on the information. The view finder optical system includes a liquid crystal display for displaying the size of an image forming area which changes according to a magnification corresponding to each pseudo focal length. After the image forming area is determined by designating a pseudo focal length, the first switch is turned on by the depression of the release button in the first state. As a result, the lens of the view finder optical system is driven and consequently, the image corresponding to the determined image forming area appears in the whole area of the view finder. An exposure is effected by the depression of the release button to the second stage.

19 Claims, 9 Drawing Sheets

PSEUDO FOCAL LENGTH CAMERA

BACKGROUND OF THE INVENTION

1. Field of the Invention

The present invention relates to a pseudo focal length camera, and more particularly, to the improvement of the view finder optical system thereof.

2. Description of the Related Art

In a camera in which the zoom lens of a photographing optical system is moved by a motor, it is not desirable to rapidly move lenses of the photographing system so that the lenses are stopped precisely at a predetermined position. In this kind of camera, generally, a lens moving speed is set to be low. Consequently, in order to obtain a desired magnification, it takes a long time to move the zoom lens to a proper position. In order to eliminate the disadvantage in performing a zooming operation, the following technique is proposed: The zoom lens is not operated, but an optical system of single focal length is operated to take a photograph. According to the technique, magnetic data for trimming is recorded onto a film so that images within a selected frame are enlarged and printed on a photographic paper according to the trimming data. The technique is hereinafter referred to as a pseudo zoom function. The pseudo zoom function provides a pseudo telescopic photographing effect which is similar to the effect obtained by carrying out a telescopic photographing.

However, in the known camera capable of taking a photograph by the pseudo zoom function, which is referred to as a pseudo focal length camera, the view finder thereof comprises a zoom optical system in which the position of a lens is changed by a motor. Therefore, similar to the drive of the zoom lens of the above-described known photographing optical system, it takes long time to obtain a desired magnification by changing the position of the lens while watching an image in the view finder. When the zoom lens of the view finder optical system is driven to the telescopic side corresponding to increase of magnification in a pseudo telescopic photographing, a photographer is likely to attend to only a principal object. In addition, it takes long to vary the magnification. Therefore, the photographer is apt to forget objects which have moved outside the visual field of the view finder during the increase of magnification. Thus the photographer might take a photograph without including an important object because importance is forgotten during the magnification changing operation.

The above description is concerned with problems caused by a long period of time required for changing the magnification of the image in the view finder. The technique for displaying the shift of the magnification by only enlarging or reducing the frame displayed in the view finder has been developed to solve the above-described problem. According to this technique, the frame corresponding to the pseudo telescopic sight is displayed more narrowly than that corresponding to the pseudo wide angle sight. This technique is able to shift rapidly the frame size and to decide a composition in consideration of the objects positioned outside the frame. But when a photograph is taken on the telescopic side, the frame is greatly reduced. Therefore, the visual field in this case is smaller than that of the view finder comprising the zoom optical system. That is, the visibility of the pseudo telescopic sight is lower than that of the pseudo wide angle sight.

Japanese Patent Laid-Open Publication No. 64-39172 discloses a pseudo focal length camera which takes a photograph using the following technique: An image corresponding to an image which should be printed on a photographic paper is converted into a video signal so as to be stored by a memory. A still picture formed based on the stored signal is enlargedly displayed on a monitor after an exposure. But a photographer can see the image after the exposure.

SUMMARY OF THE INVENTION

The present invention has been made to solve the technical problems of the known art as described above.

It is therefore an object of the present invention to provide a pseudo focal length camera which accomplishes a pseudo zooming function having a view finder high in visibility and rapidly selecting an appropriate composition in consideration of objects positioned in the periphery of the frame of the visual field.

According to an embodiment of the pseudo focal length camera of the present invention, in the first state, an image which has passed through the view finder optical system and an index showing a portion of an image corresponding to a designated pseudo focal length are displayed in the view finder. The index shows the portion of the image to be printed. The composition of a photograph is determined based on the displayed index. The index is changed when a different pseudo focal length is selected. The response to the varied pseudo focal length is faster than the response obtained by driving a zooming lens. In response to the operation of the manual operating member, the means for operating the lens system in the view finder operates. As a result, the above-described first state is switched to the second state in which the image of the size corresponding to the designated pseudo focal length is displayed in the whole area of the view finder. The lens system is driven not by the operation performed during an operation for selecting the composition, but immediately prior to a shutter release carried out after the composition is determined.

According to an embodiment of the camera, when the manual operating means serves as a release switch, the means for moving the lens system is operated by the press of the manual operating means at the first stroke and then, an exposure operation is started by the press thereof at a second stroke deeper than the first stroke. That is, the operation of the release switch allows a photographer to check the composition of a photograph, to be printed, immediately before an exposure is carried out.

According to an embodiment of the camera, when the operation of the manual operating means is completed, the means for controlling the means for moving lens system is capable of returning the view finder from the second state to the first state.

According to an embodiment of the camera, when the operation of the manual operating means is completed, the means for controlling the means for displaying an index is capable of erasing an index displayed in the view finder.

According to an embodiment of the camera, a portion of an image to be printed is displayed by an index in the view finder in correspondence with a designated pseudo focal length. The portion of the image displayed by the index is enlarged in the view finder in response to the operation of the operable member performed before a photographing operation is carried out.

According to an embodiment of the camera, with the enlargement of a portion of an image displayed by the index, a different index can be displayed in the view finder. That is, the different index corresponds to the size of the whole area in the view finder.

According to an embodiment of the method of photographing with a pseudo focal length, an image to be photographed on the film and an index showing the size of the image are initially displayed in the view finder. When a pseudo focal length is designated, with the image displayed in the view finder unchanged, a portion of an image corresponding to the designated pseudo focal length is shown by an index displaying an area different from the index initially displayed. That is, the image in the view finder is not varied, but the index is changed by designating a different pseudo focal length. Therefore, in addition to the portion of the image displayed by the index, objects situating in the periphery of the image can be seen in the view finder. In response to the operation of the operable member prior to a photographing operation, the portion of the image corresponding to the designated pseudo focal length is enlarged. Consequently, the composition of a photograph to be printed can be viewed in a comparatively large size.

According to an embodiment of the method, simultaneously with the enlargement of a portion of an image shown by the index, an index, other than the displayed index, corresponding to the enlarged portion of the image is displayed in the view finder.

According to an embodiment of the method, initially, an image to be photographed on the film in the view finder and a portion of an image corresponding to a designated pseudo focal length is indicated in the view finder by an index. In response to the operation of an operable member prior to performing a photographing operation, the portion of the image indicated by the index is enlarged.

According to an embodiment of the photographing method, if a photographing operation is interrupted, a state in which a portion of an image is enlarged is returned to a normal state in which the image is initially shown in the view finder.

According to an embodiment of the pseudo focal length camera, the image of an object is focused on a focusing screen and formed thereon. The image is seen through the eye-piece. The eye-piece lens system is driven in correspondence with a designated pseudo focal length when the operable member is operated so that a portion of the image corresponding to the designated pseudo focal length is displayed in the whole area of the view finder.

According to an embodiment of the pseudo focal length camera having a view finder system, the objective lens system, provided in the view finder system, forms a focused object image on a focusing screen. The image is seen through the eye-piece. The objective lens system is shifted in correspondence with the designated pseudo focal length when the operable member is operated so that the portion of the image corresponding to the pseudo focal length is displayed in the whole area of the view finder.

According to an embodiment of the pseudo focal length camera having the view finder system, the index elements are driven so that the image portion corresponding to the designated pseudo focal length is shown in the view finder. The liquid crystal display adjacent the focusing screen has the index elements. The liquid crystal display displays an index in taking a photograph using the pseudo focal length camera so as to indicate a print size. When the objective lens system is shifting, the drive of the index elements is prohibited.

According to an embodiment of the pseudo focal length camera, the first switch is turned on by pressing the manual operating member to the first stroke and the second switch is turned on by pressing it to the second stroke. When the first switch is turned on, the state in which the image to be photographed on the film is shown in the view finder is changed to a second state in which a portion of the image corresponding to the designated pseudo focal length is shown on the entirety of in the view finder. When the second switch is turned on, the same image as the image which would appear on the entirety of the view finder if the first switch were turned off is exposed onto the film.

According to an embodiment of the pseudo focal length camera, when the operation of the manual operating member means is completed, i.e., when the first switch is turned on and then off, an image in the view finder is returned from the second state in which a portion of the image corresponding to a designated pseudo focal length is shown on the entirety of the view finder to the first state. Like the above-described change of the states occurs when the second switch is turned on from the time when the first switch is turned on until the time when it is turned off.

According to an embodiment of the camera, time is counted from the time when the operation of the first switch is removed. When the time elapsed exceeds a predetermined time, the state in which a portion of an image corresponding to a designated pseudo focal length is shown on the entirety of the view finder returns to the initial state.

According to an embodiment of the camera, time is counted from the time when a pseudo focal length is designated. When the time elapsed exceeds the predetermined time, an index is not displayed. That is, the index displayed in the view finder as a result of the designation of the pseudo focal length disappears when the predetermined time has elapsed.

According to an embodiment of the camera, when the predetermined period of time has elapsed without a designated pseudo focal length being changed, an index is not displayed. That is, the index displayed in the view finder accompanied by the designation of the pseudo focal length disappears without being changed when the predetermined time has elapsed.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

A pseudo focal length camera according to the present invention comprises a photographing optical system P composed of single focal length and a view finder optical system F capable of carrying out zooming. The depression of the release button not shown at a first stroke allows the photometry, the measuring of an object distance and the driving of the view finder optical system F for zooming. The subsequent depression thereof at a second stroke deeper than the first stroke allows a shutter release operation.

Figure 1:
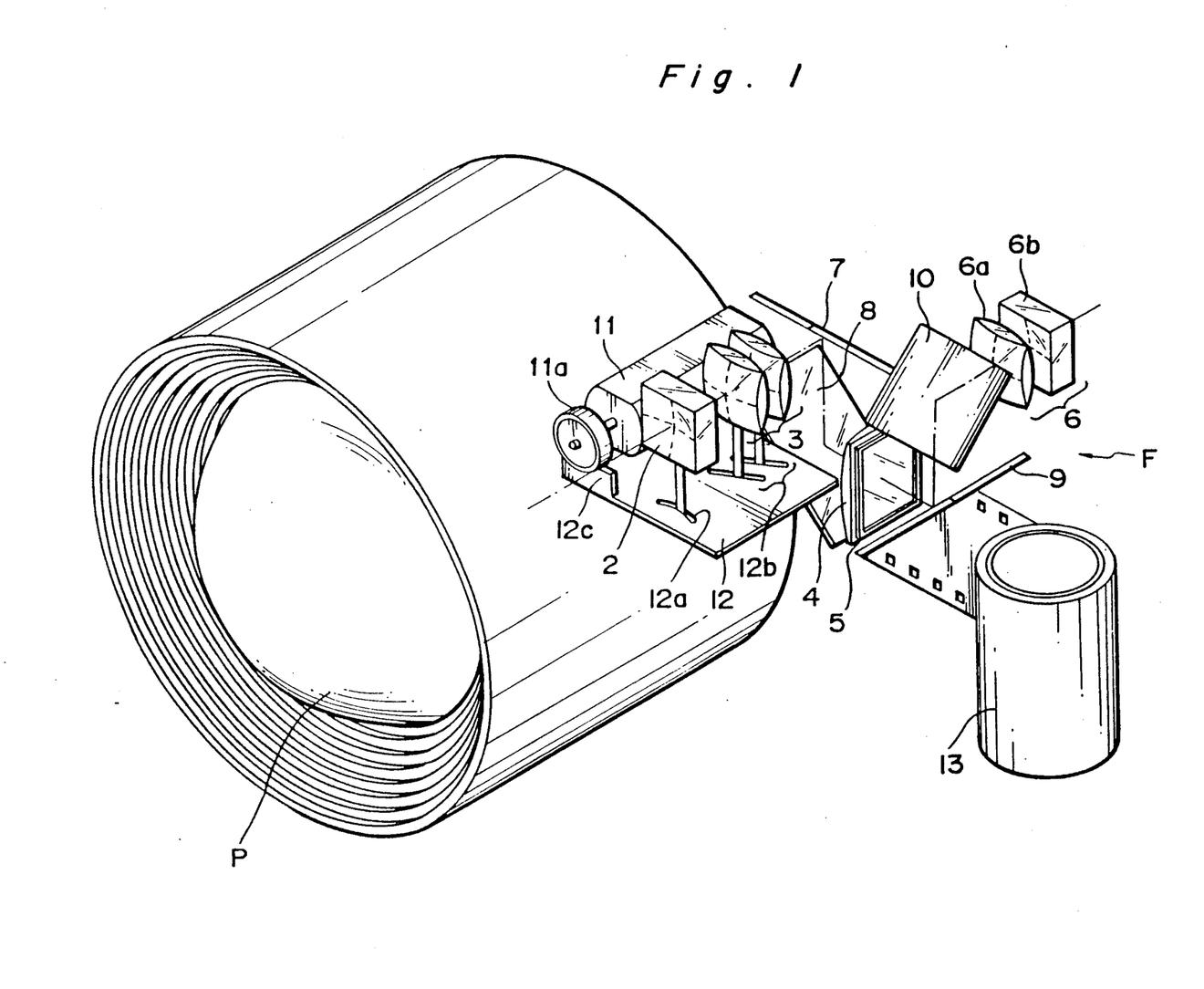
FIG. 1 is a perspective view showing the schematic constructions of the photographing optical system and view finder optical system of a pseudo focal length camera according to the first embodiment of the present invention.
Figure 2:
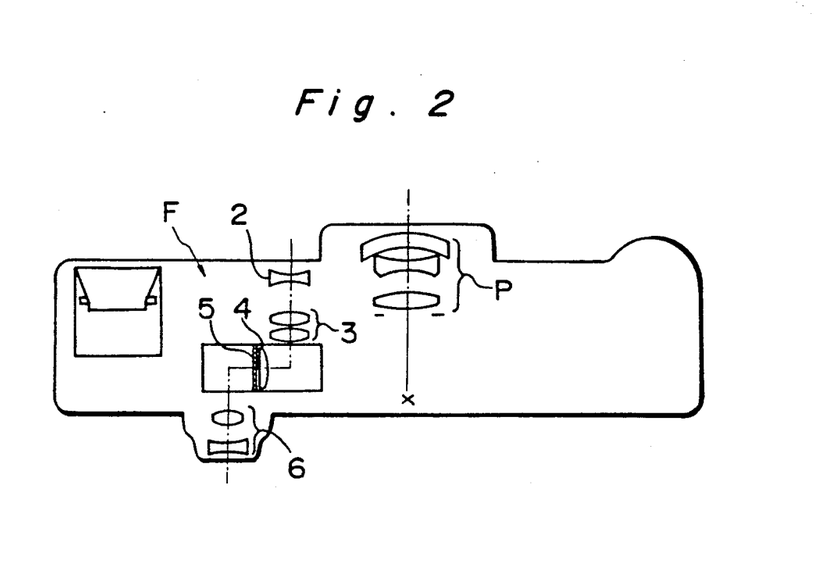
FIG. 2 is a schematic plan view showing the photographing optical system and view finder optical system of FIG. 1.

The view finder optical system F according to the first embodiment shown in FIG. 1 comprises a negative objective lens 2 and a positive objective lens 3 movable along the optical axis thereof so as to carry out a zooming; a fixed eyepiece 6 which comprises a positive lens 6a and a negative lens 6b; mirrors 7 through 10 which form an erect image similarly to a Porro prism; a condenser lens 4 disposed in the vicinity of an image forming plane positioned between the mirrors 8 and 9; and a frame display device 5.

Figure 3:
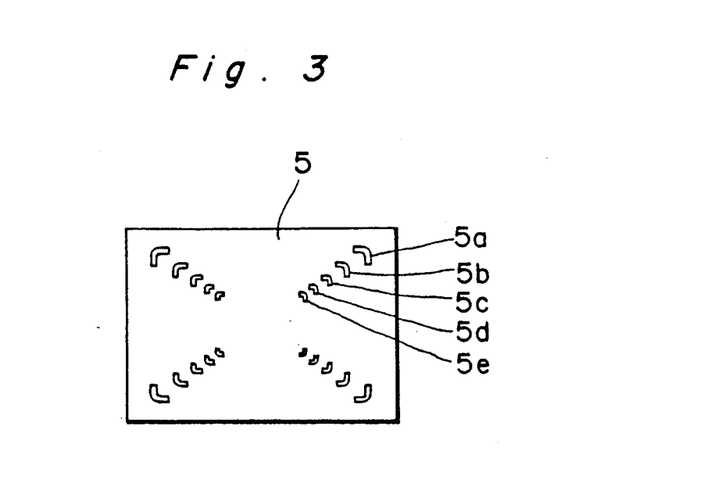
FIG. 3 shows patterns of frames displayed in the view finder of the camera according to the first embodiment.

The frame display device 5 is a liquid crystal display which displays frames of sizes 5a through 5e in the view finder with each of the frames displayed by means of a pattern of the four indexes at corners of a rectangle as shown in FIG. 3. When one of the frames becomes opaque, the area of a image to be obtained by trimming in the later printing process is indicated in the view finder. In other words, each framed image is substantially equal to each image that would be formed by a lens having a different focal length. Compared with an outer frame, an inner frame corresponds to a visual field of a lens having a long focal length. Each frame size is selected by operating a zoom switch button (not shown) mounted on the camera body. The selected image within a frame is printed with a trimming that excepts the image out of the frame. Therefore, a photograph taken by selecting an inner frame has a higher pseudo telescopic effect than a photograph taken by selecting an outer frame. In other words, a photograph taken by selecting an inner frame appears as if it had been taken by the use of a telephoto lens having a longer focal length than that taken by selecting an outer frame.

The positions of the objective lenses 2 and 3 movable along the optical axis of the view finder optical system F are regulated by a fixed guide member (not shown) and a regulating plate 12. The guide member engages a member for supporting the objective lenses 2 and 3, thus allowing them to move only rectilinearly. The regulating plate 12 have grooves 12a and 12b formed along respective loci, thus allowing the lens supporting member to be inserted into the grooves 12a and 12b. A rack 12c is formed on one end of the regulating plate 12. A gear 11a which engages the rack 12c is mounted on the shaft of a motor 11. Therefore, according to the rotation of the motor 11, the regulating plate 12 is moved in the horizontal plane perpendicular to the optical axis. The motor 11 is driven by the first stage of depression of the release button.

The construction of the control system of the camera according to the embodiment is described with reference to a circuit block diagram of FIG. 5. Switches Szt and Szw illustrated in the left of a microcomputer MC set a magnification in performing zooming. A magnification increase toward the telescopic side is effected by operating the switch Szt while a magnification decrease toward the wide angle side is effected by operating the switch Szw. When the switch Szt is turned on, the frame display device 5 changes a displayed frame to inner ones in sequence. When the switch Szw is turned on, the displayed frame is changed to outer ones in sequence. A switch $S_1$ is turned on according to the depression of the release button at the above mentioned first stroke, thus effecting a photometry measuring of an object distance and actuating the motor 11. A switch $S_2$ is turned on according to the depression of the release button at the above mentioned second stroke, thus effecting an exposure.

Figure 5:
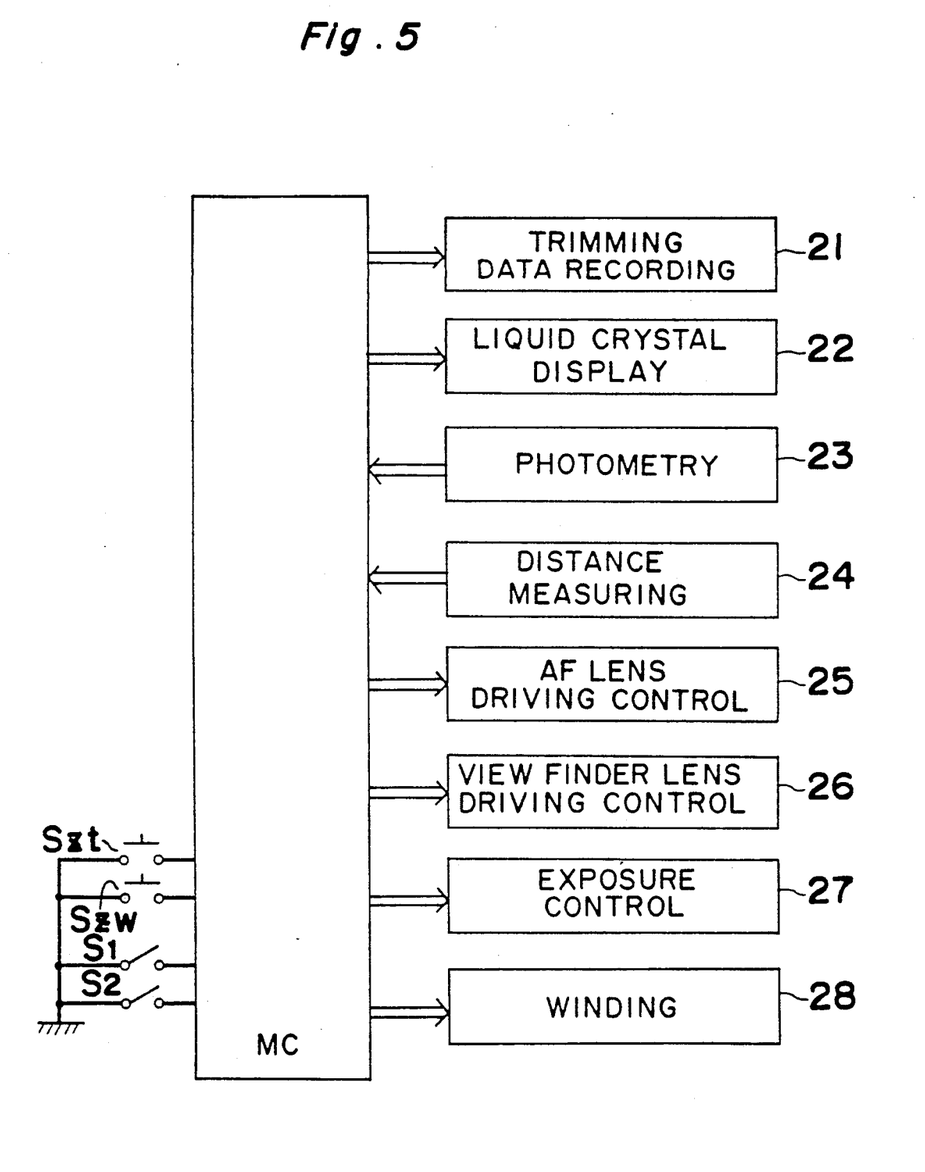
FIG. 5 is a circuit block diagram of the camera according to the embodiment.

Referring to FIG. 5, circuits for communicating with the microcomputer MC by signals are illustrated in the right of the microcomputer MC. A trimming data circuit 21 records magnetic data on a film indicating pseudo focal length for trimming, based on a signal transmitted from the microcomputer MC. Based on a signal transmitted from the microcomputer MC, a liquid crystal display circuit 22 allows the frame display device 5 to display the frame corresponding to the magnification set by the switches Szt or Szw. A photometry circuit 23 measures the luminance of an object in response to ON of the switch $S_1$, thus outputting the photometric data to the microcomputer MC. A distance measuring circuit 24 measures an object distance in response to ON of the switch $S_1$, thus outputting the object distance data to the microcomputer MC. In response to the object distance data, an AF lens driving control circuit 25 controls the lens movement in a focusing to be carried out by the photographing optical system P. In response to the magnification set by the switch Szt or the switch Szw, transmitted from the microcomputer MC, a view finder lens driving control circuit 26 controls the lens movement in zooming to be effected by the view finder optical system F. In response to the photometry data, transmitted from the microcomputer MC, an exposure control circuit 27 controls aperture size and shutter speed so that an appropriate exposure is effected. A winding circuit 28 controls a driving means (not shown) so that the driving means winds or rewinds a film.

Figure 6:
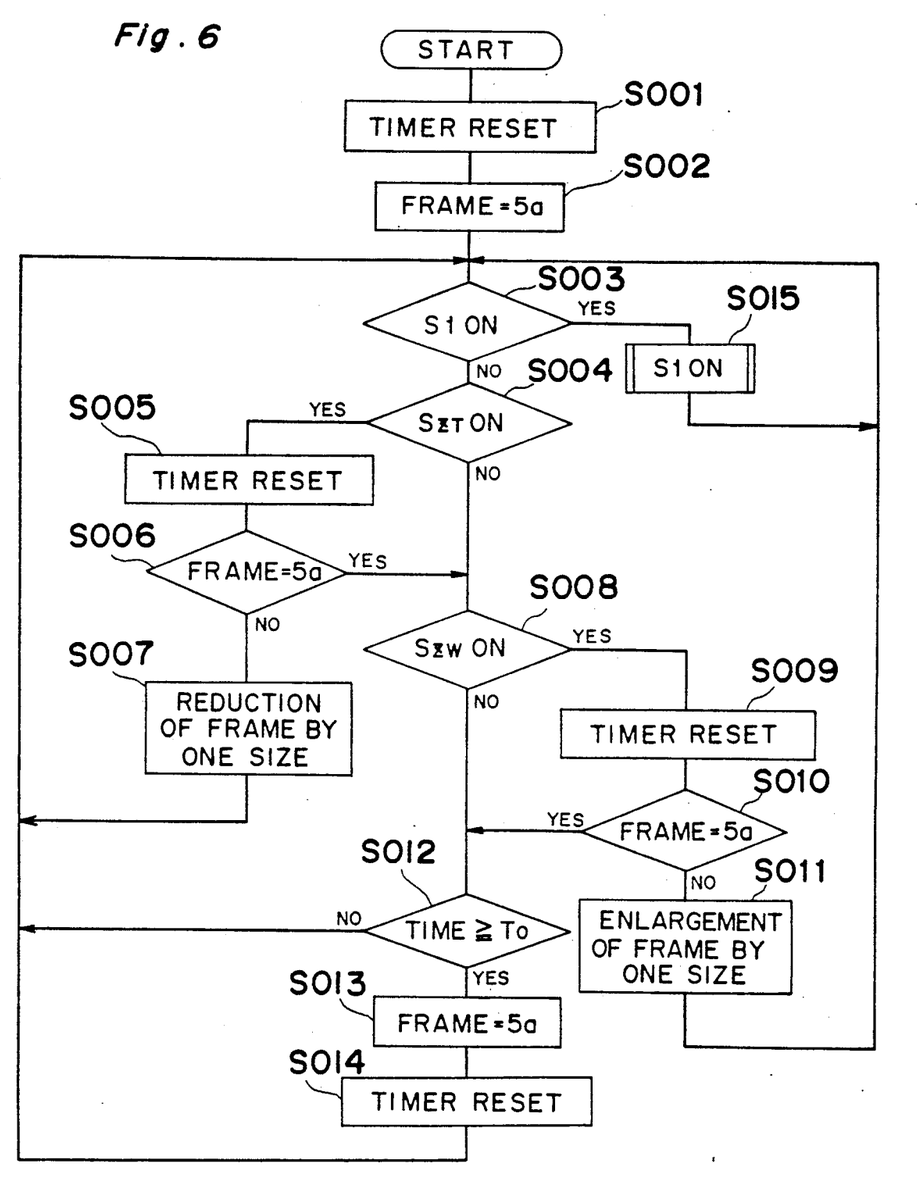
FIG. 6 is a flowchart showing the control flow of the camera according to the first embodiment.

A photographing to be taken by the pseudo focal length camera according to the first embodiment is described with reference to FIG. 4, 6 and 7.

Figure 4A:
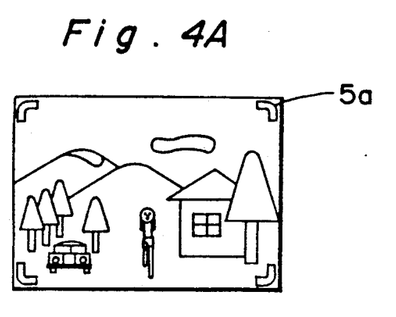
FIGS. 4a–4e are an explanatory views for explaining, the procedure for deciding a composition, by means of frame conditions displayed in the view finder of the pseudo focal length camera according to the first embodiment of the present invention

When the main switch (not shown) of the camera is turned on, a photographing operation starts. First, at step S001, the timer of the microcomputer MC is reset. The timer has a predetermined time period $T_0$ set therein and counts time when the main switch is ON. Each time the timer is reset, the timer starts counting time. At step S002, the frame display device 5 displays the frame 5a so that an operation of setting magnification can be started from the initial state, namely, the state in which the frame 5a is displayed in the view finder as shown in FIG. 4A.

A photographer decides to take a photograph by a magnification corresponding to a frame displayed in the view finder and thereafter, depresses the release button. At step S003, it is detected whether or not the switch $S_1$ is ON so as to detect whether or not the release button is depressed to the first stroke. If the switch $S_1$ is not ON, it is considered that a magnification has not yet been decided or a magnification setting operation is being carried out. Therefore, it is detected at step S004 whether or not the zoom switch Szt is ON. If the zoom switch Szt is ON, the timer is reset at step S005. It is detected at step S006 whether or not the minimum frame 5e is displayed in the view finder. If any one frame except the frame 5e is displayed at step S006, a frame smaller than the displayed frame by one size is displayed in the view finder at step S007. Then, the program returns to step S003. If the frame 5e is displayed in the view finder at step S006, a change of magnification can only decrease toward the wide angle side. Therefore, it is detected at step S008 whether or not the zoom switch Szw is ON. If the zoom switch Szt is OFF at step S004, the program goes to step S008 at which it is detected whether or not the zoom switch Szw is ON. If the zoom switch Szw is ON at step S008, the timer is reset at step S009. At step S010, it is detected whether or not the maximum frame 5a is displayed in the view finder. If it is decided at step S010 that the displayed frame is not the frame 5a, the frame larger than the displayed frame by one size is displayed at step S010. Then, the program returns to step S003 because there is a possibility that an operation of setting magnification is continued or the release button is sequentially depressed. If it is decided at step S010 that the frame displayed in the view finder is the frame 5a or that the zoom switch Szw is OFF at step S008, it is detected at step S012 whether or not the predetermined time period $T_0$ has elapsed since the timer is reset. If the predetermined time period $T_0$ has not elapsed, the program returns to step S003 because there is a possibility that an operation of setting magnification is continued or the release button is sequentially depressed. If it is decided at step S012 that the predetermined time period $T_0$ has elapsed, the frame 5a is displayed again in the view finder at step S013 so that a magnification setting operation can always be started from the above-described initial state because there is a possibility that sequential operations based on an intended photographing has been suspended. Then, the timer is reset at step S014 and then, the program returns to step S003.

Figure 4B:
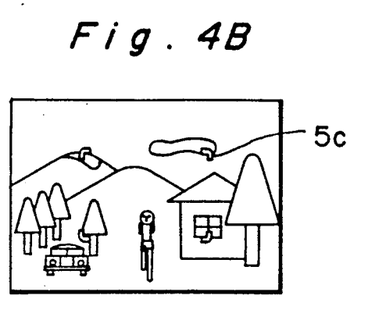
Figure 4C:
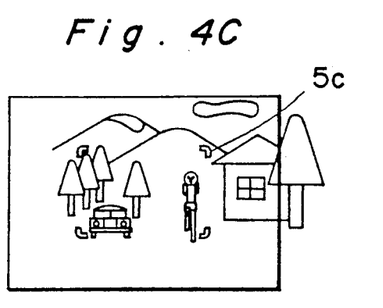
Figure 7:
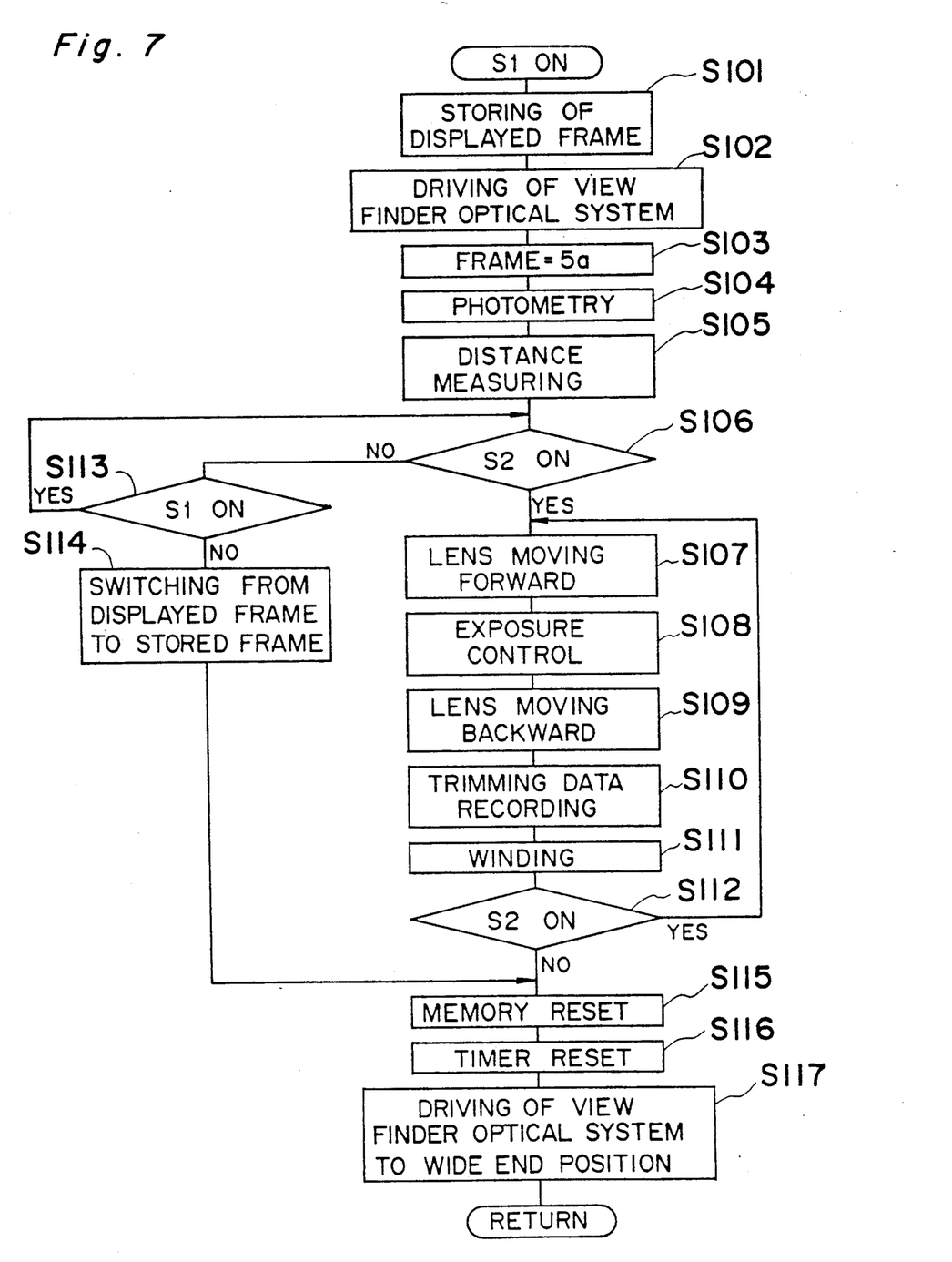
FIG. 7 is a flowchart showing the subroutine of step S015 shown in the flowchart of FIG. 6.

If the release button is depressed at the first stroke halfway in the above repeatable flow, the program goes to step S015 after the switch $S_1$ becomes ON at step S003 in which the process is carried out according to the subroutine shown in FIG. 7. If a frame corresponding to a decided magnification is the frame 5c, the frame 5c is displayed in the view finder as shown in FIG. 4B immediately before the switch $S_1$ will be turned on. But if the predetermined time period $T_0$ has elapsed without being turned on the switch $S_1$, the state of frame display returns to the initial state as shown in FIG. 4A, i.e., the frame 5a is displayed in the view finder. When the frame 5c is displayed in the view finder as shown in FIG. 4B, the photographer can see the scene outside the frame 5c in the view finder and select a desired photographing range as shown in FIG. 4C from the scene. At this time, the release button is depressed at the first stroke. In the following description with respect to the subroutine of step S015, the decided frame corresponding to the magnification is suppose to be the frame 5c.

At the first step S101 of the subroutine, a data of the frame 5c is stored and at step S102, the motor 11 for driving the view finder optical system F is driven to move the objective lenses 2 and 3. The objective lenses 2 and 3 are moved to take positions for enlarging the image within the frame 5c entirely in the view finder so that the image to be photographed based on a magnification set can be displayed in the view finder. In the first embodiment, since the frame display device 5 is positioned behind the objective lenses 2 and 3 which make a zooming operation, the frame 5c displayed in the view finder is not enlarged, i.e., the size of the frame 5c is not changed even if the objective lenses 2 and 3 carry out a zooming operation. While the view finder optical system F is moving all display of index is inhibited. At step S103, the display of the frame is changed from the frame 5c to the frame 5a and the state in the view finder is as shown in FIG. 4D.

When the switch $S_1$ becomes ON, photometry and measuring of an object distance are performed at steps S104 and S105, respectively. Then, the depression of the release button to the second stroke is awaited. It is detected at step S106 whether or not the switch $S_2$ is ON. If the switch $S_2$ is not ON, it is detected at step S113 whether or not the switch $S_1$ is ON, namely whether or not the release button is still depressed to the first stroke. If the switch $S_1$ is ON at step S113, the program returns to step S106. This flow is repeated until the switch $S_2$ becomes ON at step S106. If the switch $S_2$ is ON at step S106, the photographing lens is moved forward so as to carry out a focusing at step S107. At step S108, an exposure is performed in an appropriate aperture size and at an appropriate shutter speed. At step S109, the photographing lens is moved backward to return it to the initial position. At step S110, a magnetic data for above mentioned trimming is recorded on the exposed frame of the film. Then, at step S111, one frame of the film is wound. The camera according to the first embodiment is capable of taking a continuous photographing. It is detected at step S112 whether or not the switch $S_2$ is ON again. If the switch $S_2$ is ON, the flow from step S107 to step S111 is repeated until the switch $S_2$ is OFF at the step S112.

Figure 4D:
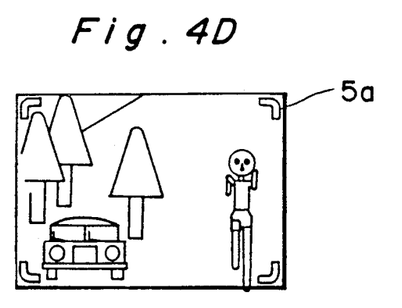

If the photographer intends to change the composition seeing the state of FIG. 4D in the view finder after depressing the release button at the first stroke, he/she lifts up his/her finger from the release button without depressing the release button to the second stroke. Therefore, it is decided at step S106 that the switch $S_2$ is not ON and at step S113 that the switch $S_1$ is not ON. In such case, at step S114, the frame 5a set at step S103 is switched to the frame 5c stored at step S101. At step S115, the frame 5c stored at step S114 is reset. At step S116, the timer is reset. At step S117, the motor 11 is driven so that the objective lenses 2 and 3 of the view finder optical system F are returned to the end position on the wide angle side. Then, the program returns to step S103. Consequently, the state in the view finder is as shown in FIG. 4C. A composition selecting operation including a magnification setting operation can be continued.

As described above, according to the camera of the first embodiment, after deciding a composition, the photographer can take a desired photograph by depressing the release button to the second stroke. In other words, before carrying out a shutter release, he/she can check a composition by seeing the state in the view finder as shown in FIG. 4D. If he/she intends to suspend the photographing operation by checking the composition in the view finder, he/she lifts up his/her finger from the release button without depression of the button to the second stroke, thus resuming a composition selecting operation. In particular, the photographer can check the composition by seeing an expanded image displayed on the entirety of the view finder. The zooming operation of the movable lens is carried out only when a magnification is decided. The liquid crystal display is able to change rapidly the display of the frame during a magnification selecting operation.

Figure 4E:
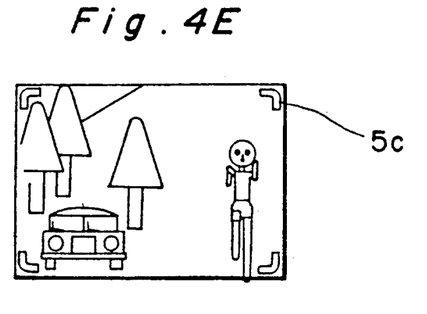
Figure 8:
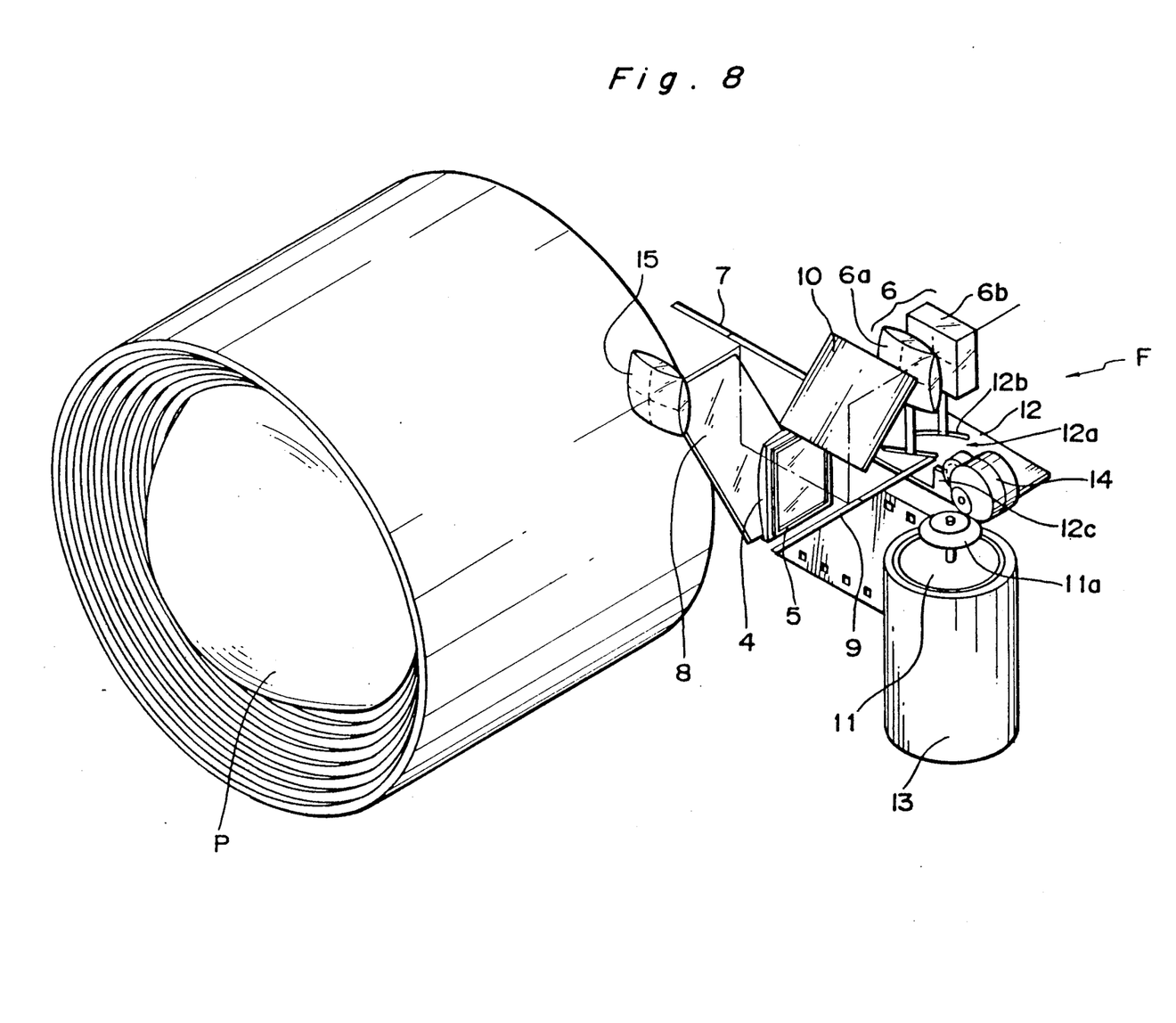
FIG. 8 a perspective view showing the schematic constructions of the photographing optical system and view finder optical system of a pseudo focal length camera according to the second embodiment of the present invention.

A camera according to a second embodiment of the present invention is described below. In the second embodiment, as shown in FIG. 8, eyepieces 6a and 6b, of the view finder optical system F, positioned rearward of the frame display device 5 carry out a zooming operation. Therefore, when the motor 11 of the view finder optical system F is driven at a step corresponding to step S102 of the flowchart of the first embodiment, the eyepieces 6a and 6b are driven in the second embodiment. Since not only an image, but also a frame is enlarged in the view finder, the second embodiment eliminates the need for the provision of a step corresponding to step S103 at which the frame 5a is set at step S103 in the first embodiment. Therefore, the state as shown in FIG. 4C changes to the state as shown in FIG. 4D at step S103 in the first embodiment while the state as shown in FIG. 4C changes to the state as shown in FIG. 4E in the second embodiment. In the first embodiment, when a photographing operation is suspended, a composition selecting operation including a magnification setting operation can be continued from the state as shown in FIG. 4C as follows. On the assumption that the frame 5a is set at step S103, a frame corresponding to a decided magnification is stored at step S101, then, at step S114, the display of the frame 5a is switched to the display of the frame stored at step S101, and thereafter, at step S115, the memory is reset. But in the second embodiment, the provision of steps S101, S114, and S115 are not required. The motor 11 is accommodated in the film winding spool 13 and the driving force thereof is transmitted to the eyepieces 6a and 6b through gears 11a and 14 and the rack 12c of the regulating plate 12. The objective lens 15 is composed of only a positive lens. The construction, operation, and advantage of the second embodiment are similar to those of the first embodiment.

As a modification of the first embodiment, it is possible to construct a camera having the same construction as that of the first embodiment and omit steps S104, S114, and S115 from the flowchart of the first embodiment. In this case, the display in the view finder returns from the state as shown in FIG. 4D to the state as shown in FIG. 4A when a photographing operation is suspended after the release button is depressed to the first stroke and a composition selecting operation including a magnification operation is repeated from the state as shown in FIG. 4A. The operation and advantage of the modification are similar to those of the first embodiment.

Figure 9:
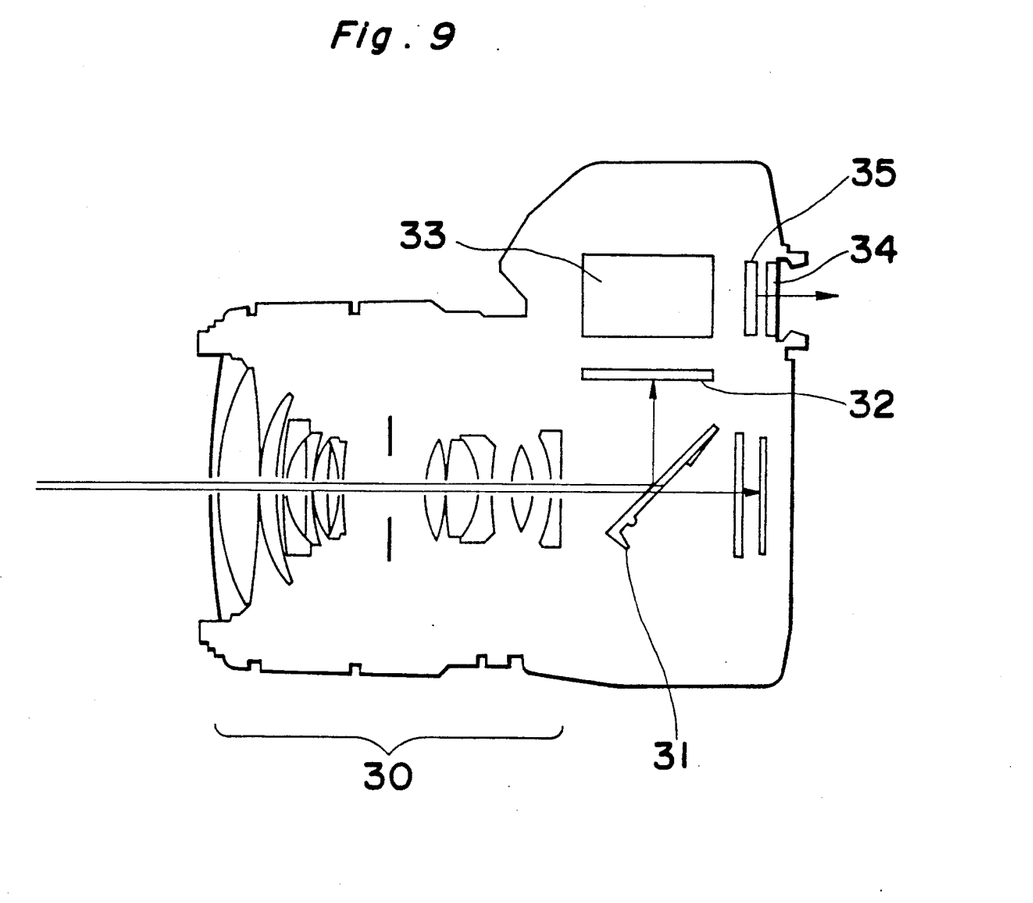
FIG. 9 is a schematic sectional side view showing the optical system of a pseudo focal length camera of a single-lens reflex type according to the third embodiment of the present invention.
Figure 10:
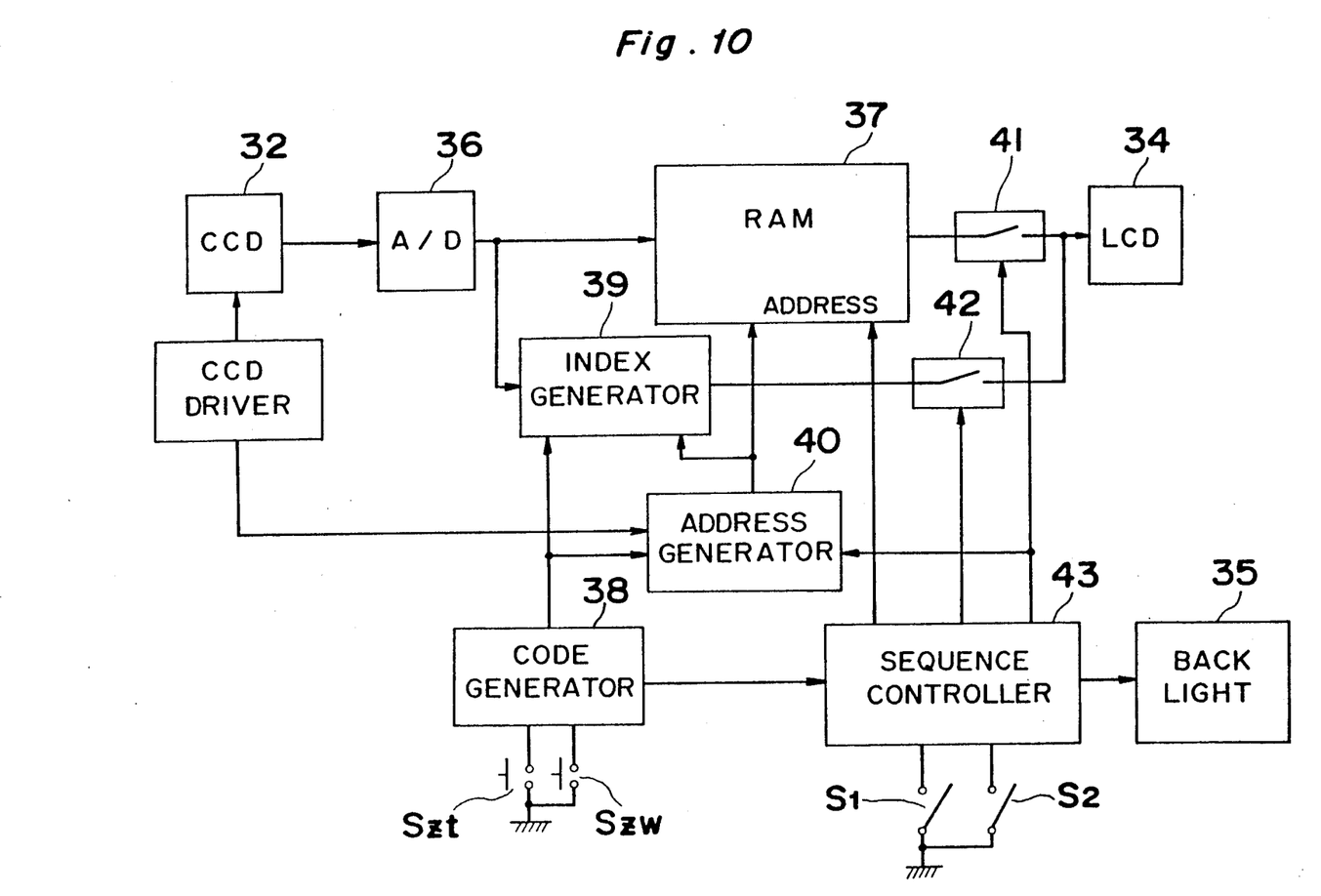
FIG. 10 is a circuit flock diagram of the camera according to the third embodiment.

Another embodiment is shown in FIG. 9 and FIG. 10. In this embodiment, the objective lens system explained above serves both as a taking lens and a part of the finder lens system. In this embodiment, expanding image size is operated by an electrical construction.

A camera in FIG. 9, a part of light from an object passes through the objective lens 30 and a semi-transparent mirror 31, and is focused on the film plane. The other part of light passes through the objective lens and is reflected by the semi-transparent mirror 31, and is focused on a CCD 32; charge coupled device. The CCD 32 detects a focused image and generates an electrical signal. This signal is processed in many circuits 33 as described below and is sent to an LCD 34; liquid crystal display, and is shown by the LCD 34 as an image with illuminated from behind it with a back light illuminator 35.

According to FIG. 10, a circuit program for a signal processing is explained as follows. An obtained analogue electrical signal from the CCD 32 is converted into digital signals by the converter 36 and are stored in the RAM 37 with addressed. By the index selection with the switch Szt or Szw, code generator 38 generates a code of a pseudo focal length to an index generator 39 and to an address generator 40 which generates addresses in accordance with the pseudo focal length. Digital data corresponding to the designated addresses are read out from the RAM 37 and sent to the LCD with passing through a gate 41. The address generator 40, the RAM 37, the gate 41, the gate 42 and back light illuminator 35 are controlled by a sequence controller 43.

When a group of indexes is selected by the switch, the controller 43 controls the gate 42 to display the index an image on the focused image. From this condition, when the switch $S_1$ is operated, the controller 43 controls the address generator 40, the RAM 37, the gate 41 and gate 42 to read out signals corresponding to an image portion designated by the switch Szt or Szw and to display the image portion on the LCD 34 at the same time indexes are displayed on the periphery of the image portion. When the switch $S_2$ is operated the whole image is photographed and the display on the LCD 34 returns to initial displaying state.

Although the present invention has been fully described in connection with the preferred embodiments thereof with reference to the accompanying drawings, it is to be noted that various changes and modification are apparent to those skilled in the art. Such changes and modifications are to be understood as included within the scope of the present invention as defined by the appended claims unless they depart therefrom.

What is claimed is:

1. A pseudo focal length camera comprising:
a view finder, having a view area, for displaying an image formed by a lens system in the view finder in the view area;
a manual operating member;
means for designating a pseudo focal length;

means for displaying an index in the view area to indicate a portion of the image corresponding to the designated pseudo focal length; and means, in response to the operation of the manual operating member, for moving the lens system in the view finder to change the state of the view finder from a first state in which the image to be photographed is shown in the view area to a second state in which the portion of the image corresponding to the designated pseudo focal length is shown as the whole view area.

2. A pseudo focal length camera as claimed in claim 1, wherein said manual operating member also serves as a release switch so that in response to a first stroke of the operating member, the moving means is operated and in response to a second stroke deeper than the first stroke, an exposure operation is started.

3. A pseudo focal length camera as claimed in claim 1 further comprising means for controlling the moving means to return the state of the view finder from the second state to the first state when the operation of the manual operating member is finished.

4. A pseudo focal length camera as claimed in claim 1 further comprising means for controlling the displaying means to erase the index in the view area when the operation of the manual operating member is finished.

5. A pseudo focal length camera comprising:
a view finder having a view area;
means for designating a pseudo focal length;
means for displaying an index in the view area corresponding to the designated pseudo focal length so that a print size of a photograph is displayed;
an operable member; and
means for expanding a portion of the image corresponding to the pseudo focal length in response to the operation of the operable member prior to a photographing.

6. A pseudo focal length camera as claimed in claim 5 further comprising means for displaying another index on the expanded portion in the view area prior to designating a pseudo focal length.

7. A method for photographing with a pseudo focal length comprising the steps of:
initially showing an image to be photographed in a view area of a view finder with a display of an index which indicates a size of the image in the view area;
designating a pseudo focal length;
displaying another index corresponding to the designated pseudo focal length in the view area in which the image to be photographed is still shown; and
expanding a portion of the image corresponding to the pseudo focal length in response to an operation of an operable member prior to a photographing.

8. A method as claimed in claim 7, wherein the enlarging step displays another index corresponding to the enlarged portion of the image at the same time.

9. A method for photographing with a pseudo focal length comprising the steps of:
initially showing an image to be photographed in a view area of a view finder;
displaying an index in the view area for indicating the size of a portion of the image corresponding to a designated pseudo focal length; and
enlarging the portion of the image in the view area of the view finder, in response to an operation of an operable member, prior to a photographing.

10. A method as claimed in claim 9 further including a step for returning the view area without photographing from expanded state in which the image portion is expanded in the view area to a normal state in which the image is shown in the view area.

11. A pseudo focal length camera comprising:
means for designating a pseudo focal length;
an objective lens system for focusing an object image on a focal plane;
an eye-piece lens system for showing the focused image on the focal plane; and
means, having an operable member, for driving the eye-piece lens system in correspondence with the designated pseudo focal length when the operable member is operated so that a portion corresponding to the pseudo focal length is shown on the entirety of the view finder.

12. A pseudo focal length camera having a view finder system comprising:
means for designating a pseudo focal length;
an objective lens system, provided in the view finder system, for focusing an object image on a focal plane;
an eye-piece lens system for showing the focused image on the focal plane; and
means, having an operable member, for shifting the objective lens system in correspondence with the designated pseudo focal length when the operable member is operated so that a portion corresponding to the pseudo focal length is shown as whole area of the view finder.

13. A pseudo focal length camera as claimed in claim 12 further comprising:
liquid crystal display, having index elements, located on the focal plane for displaying an index which indicate a print size in pseudo focal photographing;
means for driving the index elements of the liquid crystal display so that the image portion corresponding to the designated pseudo focal length is shown; and
means for inhibiting the display operation of the driving means while the objective lens system is in a shifting operation.

14. A pseudo focal length camera comprising:
view finder, having a view area, for showing an image in the view area;
manual operating member for operating a first switch when the manual operating member is pushed to a first stroke and for operating a second switch when the manual operating member is further pushed to a second stroke which is deeper than the first stroke;
means, in response to the operation of the second switch, for exposing a same image as the image shown in the view area;
means for designating a pseudo focal length; and
means, in response to the operation of the first switch, for changing state of the view finder from a first state in which the image to be photographed is shown in the view area to a second state in which a portion of the image corresponding to the designated pseudo focal length is shown as the whole view area.

15. A pseudo focal length camera as claimed in claim 14 further comprising means for controlling the changing means to return the state of the view finder from the second state to the first state when the operation of the manual operating member is finished.

16. A pseudo focal length camera as claimed in claim 14 further comprising:
   means for counting a predetermined time from removing the operation of the first switch; and
   means for controlling the changing means to return the state of the view finder from the second state to the first state in response to the count-up of the counting means.

17. A pseudo focal length camera which photographs an image on a medium and records data corresponding to a pseudo focal length on the medium at a photographing so as to print a portion of the photographed image in accordance with said data, comprising:
   means for designating the pseudo focal length;
   timer means for counting a predetermined time from designating of the designating means;
   means, in accordance with the designated pseudo focal length, for displaying an index in the view area of a view finder; and
   means for controlling the displaying means to interrupt a display operation of the displaying means in response to count-up of the timer means.

18. A pseudo focal length camera as claimed in claim 17 further comprising means, in response to the count-up of the timer means, for changing a state shown in the view area to a state prior to a designation by the designating means.

19. A pseudo focal length camera comprising:
   a view finder having a view area;
   means for designating a pseudo focal length;
   means for showing an image and a frame for indicating a corresponding portion of the image to the designated focal length in the view area prior to photographing;
   means for showing the portion corresponding to the designated pseudo focal length by expanding the portion in the view area prior to photographing;
   means for selecting one of the showing means prior to photographing.

* * * * *